(No Model.) 2 Sheets—Sheet 1.

F. D. WEBER.
FENDER FOR CARS.

No. 529,052. Patented Nov. 13, 1894.

WITNESSES:

INVENTOR
Frederick D. Weber
BY
ATTORNEYS.

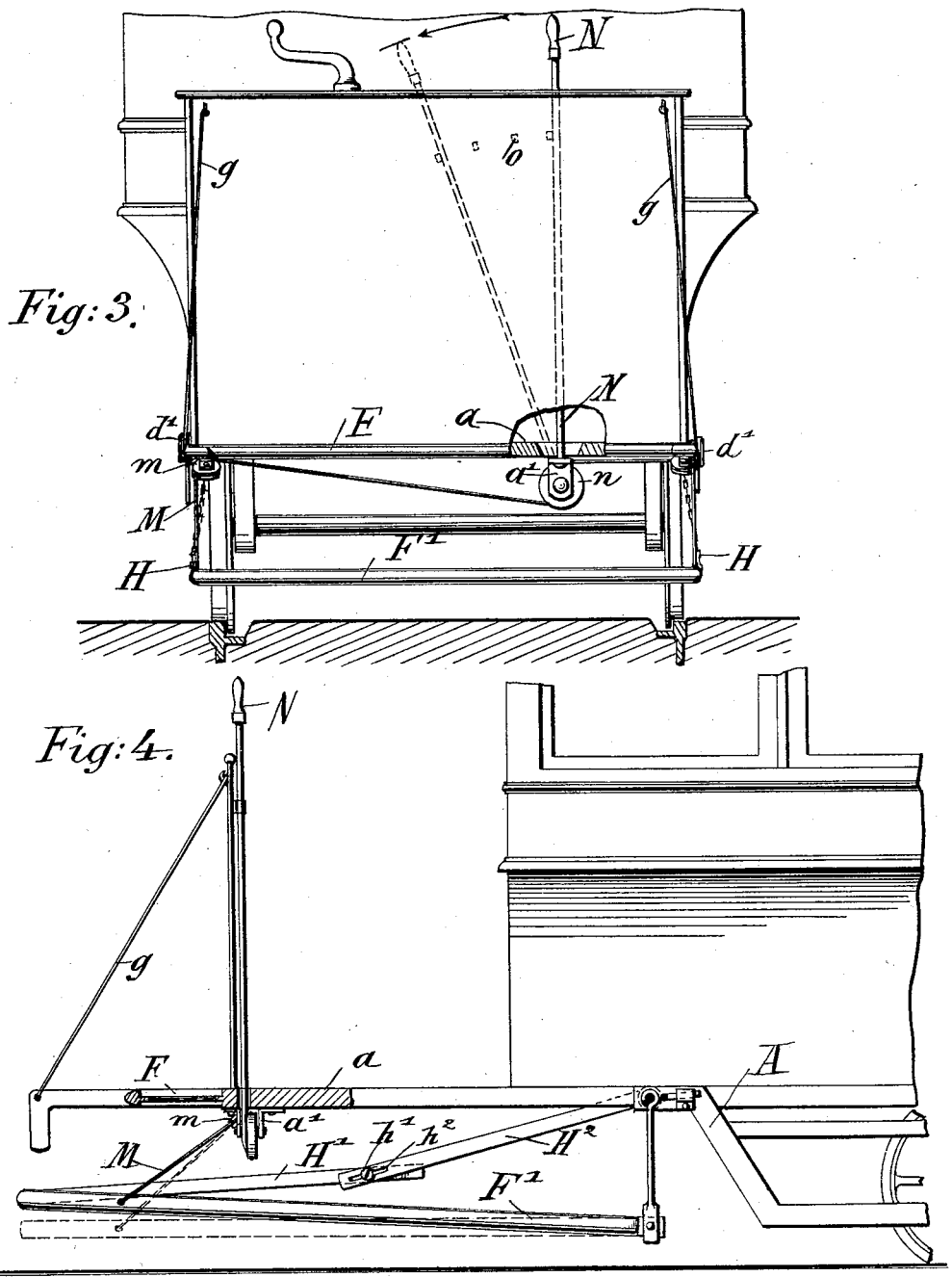

UNITED STATES PATENT OFFICE.

FRIEDERICK D. WEBER, OF BROOKLYN, NEW YORK, ASSIGNOR OF ONE-HALF TO HENRY C. CHRISTGAN, OF SAME PLACE.

FENDER FOR CARS.

SPECIFICATION forming part of Letters Patent No. 529,052, dated November 13, 1894.

Application filed February 23, 1894. Serial No. 501,108. (No model.)

*To all whom it may concern:*

Be it known that I, FRIEDERICK D. WEBER, a citizen of the United States, residing at Brooklyn, in the county of Kings and State of New York, have invented certain new and useful Improvements in Fenders for Cars, of which the following is a specification.

This invention has reference to an improved fender for cable-cars, trolley-cars and other cars, which can be readily applied to the bottom frame of the car in front of the trucks, and is adapted to prevent accidents to life and limb, by providing also means for protecting the car, the fender being also provided with means for protecting the same from injury by passing vehicles; and the invention consists of a fender for cable or other cars, which is attached to the car-frame in front of the trucks, on a level with the car-platform, said fender-section being provided with a pivoted forward-projecting buffer or guard, and of a lower fender, that is supported below the upper fender close to the rails and is adapted to extend beyond the said upper fender, the rear end of the lower fender being cushioned by spring-actuated rods, so as to give when placed in contact with obstructions, both fenders together taking up any person or animal that crosses the track in front of the car, so as to prevent injury to the same.

Figure 1:
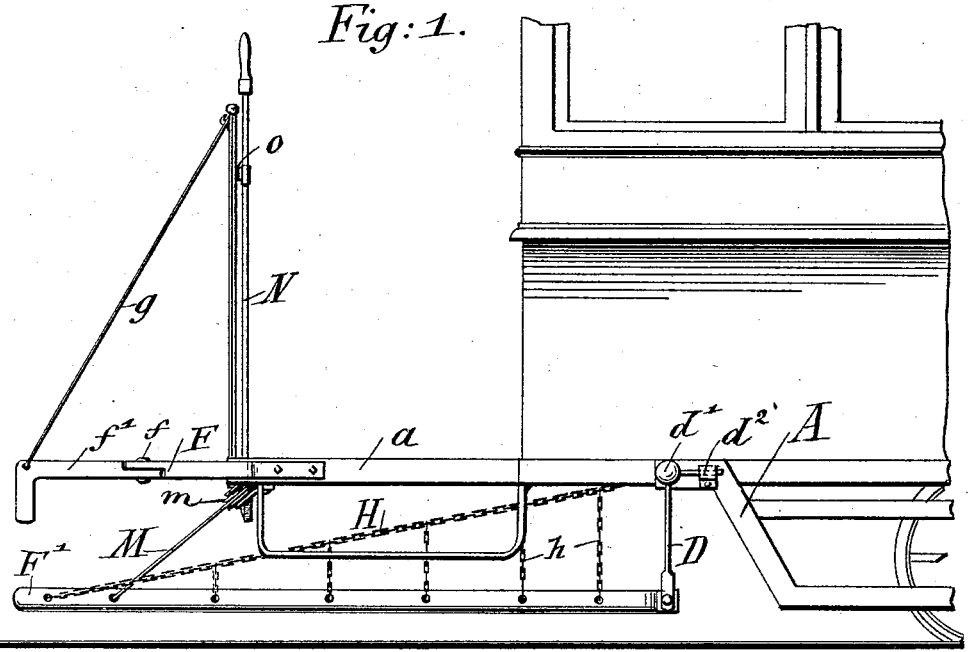
Figure 2:
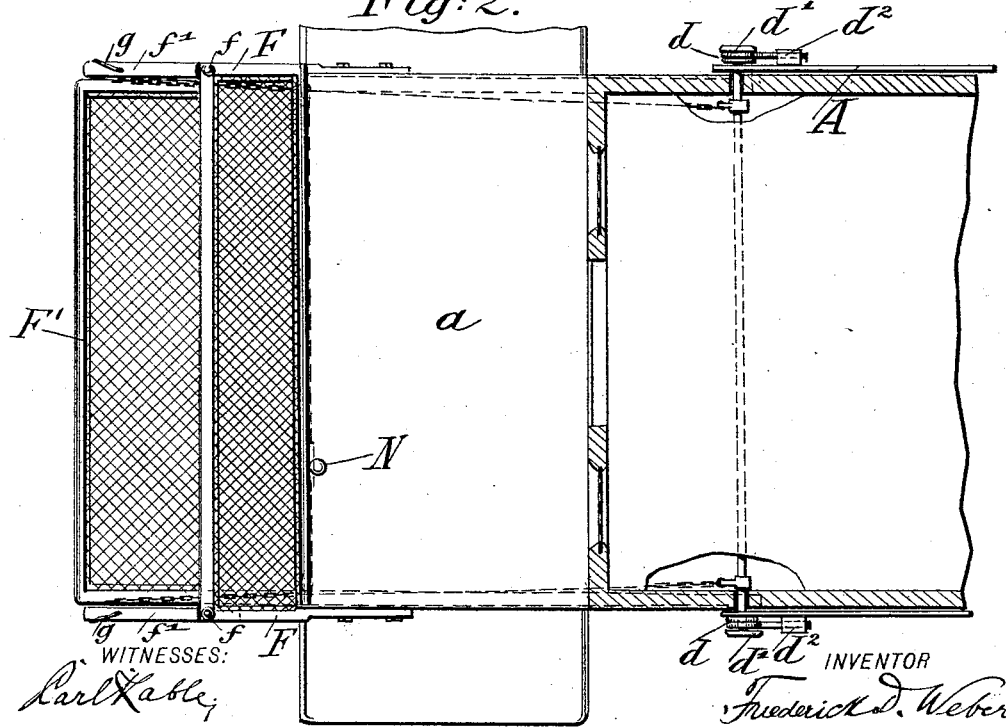

In the accompanying drawings, Figure 1 represents a side elevation of the forward portion of a street or other car provided with my improved fender attachment. Fig. 2 is a plan view partly in horizontal section on line 2—2, Fig. 1. Fig. 3 is a front elevation partly broken away, of the car-platform with the fender-attachment and the mechanism, by which the lower fender can be raised, and Fig. 4 is a side elevation, partly in vertical section, of a modified construction of my improved fender attachment.

Similar letters of reference indicate corresponding parts.

Referring to the drawings, A represents the bottom frame of a cable, trolley or other car, and $a$ the platform of the same.

My improved fender-attachment consists of two fender sections, a short upper one F, which is attached to the front of the platform on a level with the same, as shown clearly in Fig. 1 and of a second longer fender section F', which is preferably located in front of the truck below the section F and supported at its rear ends by means of spring-actuated rods D from the bottom frame of the car. The upper ends of the rods D are coiled to form springs $d$ located on studs $d'$, projecting from the sides of the car-frame, the projecting upper ends of said rods being anchored in eyes or brackets $d^2$.

The upper fender F is composed of a heavy U-shaped rod-iron frame, between which and the dash-board of the car is arranged a suitable netting or spring. To each side of the U-shaped frame of the fender F is attached by vertical pivots $f$ a forward extending arm $f'$, that serves as a guard for protecting the lower fender against injury by passing vehicles and which serves furthermore as a means of support for any person that is taken up by the fender attachment, so as to prevent the person from slipping over toward either side after once being taken up by the fenders. The upper ends of the pivoted guard-arms G are each connected by a wire cable or chain $g$ with the upper part of the dash-board, said cables preventing the arms from swinging laterally away from the car when a victim on the fender takes hold of one of them, and also allowing the arms to swing inwardly and give when a crossing vehicle runs into the same. The lower fender F' is also composed of a U-shaped main frame, which extends forward as far as do the guard-arms G and which is provided with a netting or screen that extends from the front of the U-shaped frame toward the rear ends of the same.

The lower fender preferably projects about fifteen to eighteen inches beyond the platform.

The sides of the fender-frame are connected by short chains $h$ with an inclined rod or chain H that extends upwardly from a point near the front of the fender-frame to near the point of suspension of the spring-actuated rods $F^2$. This means of support for the lower fender attachment serves for two purposes, first, for holding the fender at its proper position and at the proper distance from the rails; second, as a guard to prevent any one, who is taken up by the lower fender, from being delivered on either side of the same.

The front end of the lower fender F' is connected by chains or cables M which pass over pulleys m applied to the corners of the car platform onto a roller n, that is applied to the lower end of the hand-lever N, which is pivoted to a downwardly-extending support or bracket a' on the platform and is adapted to be moved into engagement of the suitable teeth or pins o on the dash-board, so that the lower fender F' can be raised for a certain distance to permit the same to pass over the track in case repairs are being made, or the rear fender may be raised out of effective position until the direction of movement of the car is reversed.

In place of the side chains or cables h, H, which support the lower fender F', strong connecting braces can be used, which are made of two sections H' and H² connected about midway above the fender by means of pivots h' on one section which engage the slotted ends of the other section, so that the sectional braces give sufficiently, when the fender is raised, as shown in Fig. 4.

When the car is moving over the track, the lower fender is lowered, so that the same is close to the track. The distance can be regulated to some extent by operating the hand-lever N. By the forward motion of the car, the lower fender will first strike an obstruction on the track causing a person or animal to be thrown out of its balance and tilted over onto the fender on which it will find a seat or rest, the netting of the same giving sufficiently for this purpose. In case no hold should be obtained on the upper fender, the person would be scooped up by the lower fender, which, owing to the pressure exerted on the same, will be forced slightly backward on its spring-cushioned suspension rods, and take up the person in a reliable manner and retain the same thereon until the car is brought to a stop, so that the person can then be removed therefrom. If desired, the front end of the lower fender can be guided by means of rollers on the track-rails, but this is not necessary, as the weight of the said fender is not sufficient to require them.

When the car is moving in a forward direction, the fender of the car at the front end is lowered, while the fender attachment at the rear end is raised, so as to be less in the way. In case the lower fender is struck by passing vehicles or obstructions, it gives sufficiently to prevent any damage to the same, serving to some extent as a buffer and a protection for the guard-arms of the upper fender-frame.

The fender-attachment described composed of the upper and lower fenders, can be applied to the bottom of the car and form a very effective and comparatively simple attachment for the car.

It is obvious, that the fender construction can be attached to the front of the truck-frame, or to any part of the body of the car, in front of the truck or to the platform and I do not confine myself to the special construction shown, as owing to the construction of the car, the location of the fender may be changed to any part of the car-body.

Having thus described my invention, I claim as new and desire to secure by Letters Patent—

1. The combination with the bottom frame of a car, of a fender-attachment, composed of a stationary fender, projecting in front of the car platform, and of a lower fender suspended at its rear end by spring-cushioned rods and suitable cables or chains, the lower fender-frame extending beyond the upper frame, substantially as set forth.

2. The combination with the bottom-frame of a car, of a stationary upper fender extending in the front of and on a level with the car platform, a netting between the upper fender-frame and the platform, guard-arms pivoted to the sides of said upper fender, and a lower fender supported in front of the truck by means of spring-cushioned rods suspended from the bottom frame of the car and suitable cables or chains, and means for raising or lowering the lower fender, substantially as set forth.

In testimony that I claim the foregoing as my invention I have signed my name in presence of two subscribing witnesses.

FRIEDERICK D. WEBER.

Witnesses:
PAUL GOEPEL,
K. R. BRENNAN.